United States Patent

Dockree

[11] 3,871,687
[45] Mar. 18, 1975

[54] PIPE CONNECTIONS AND CONNECTORS THEREFOR

[75] Inventor: Basil Frederick Dockree, Welwyn Garden City, England

[73] Assignee: Gabine Precision Tubes Limited, Hertfordshire, England

[22] Filed: Oct. 3, 1973

[21] Appl. No.: 403,046

[30] Foreign Application Priority Data
Oct. 6, 1972 United Kingdom .............. 46329/72

[52] U.S. Cl. .................. 285/53, 285/292, 285/347
[51] Int. Cl. ............................................. F16l 11/12
[58] Field of Search ........................... 285/48-54, 285/330, 355, 347, 292

[56] References Cited
UNITED STATES PATENTS

| | | | |
|---|---|---|---|
| 1,041,260 | 10/1912 | Erickson | 285/330 |
| 1,231,202 | 6/1917 | Saylor | 285/50 |
| 2,246,436 | 6/1941 | Downey | 285/347 |
| 3,284,110 | 11/1966 | Marcus et al. | 285/292 |
| 3,432,186 | 3/1969 | Braun | 285/53 |

FOREIGN PATENTS OR APPLICATIONS

| | | | |
|---|---|---|---|
| 1,203,906 | 7/1958 | France | 285/53 |
| 438,262 | 11/1935 | United Kingdom | 285/53 |
| 102,807 | 1/1938 | Australia | 285/50 |

Primary Examiner—Dave W. Arola
Attorney, Agent, or Firm—Cushman, Darby & Cushman

[57] ABSTRACT

A pipe connection between two pipe lengths arranged end to end comprises an annular ring of electrical insulating material positioned between the pipe ends. The ring has annular flanges surrounding each pipe with an O-ring seal between each flange and the respective pipe end. A single casting overlaps each flange and the outer surface of each pipe end which is provided with anchoring means precluding longitudinal movement of the pipe end relative to the casting. An outer sleeve surrounds the casting and further anchoring means preclude longitudinal movement of the sleeve relative to the casting.

10 Claims, 2 Drawing Figures

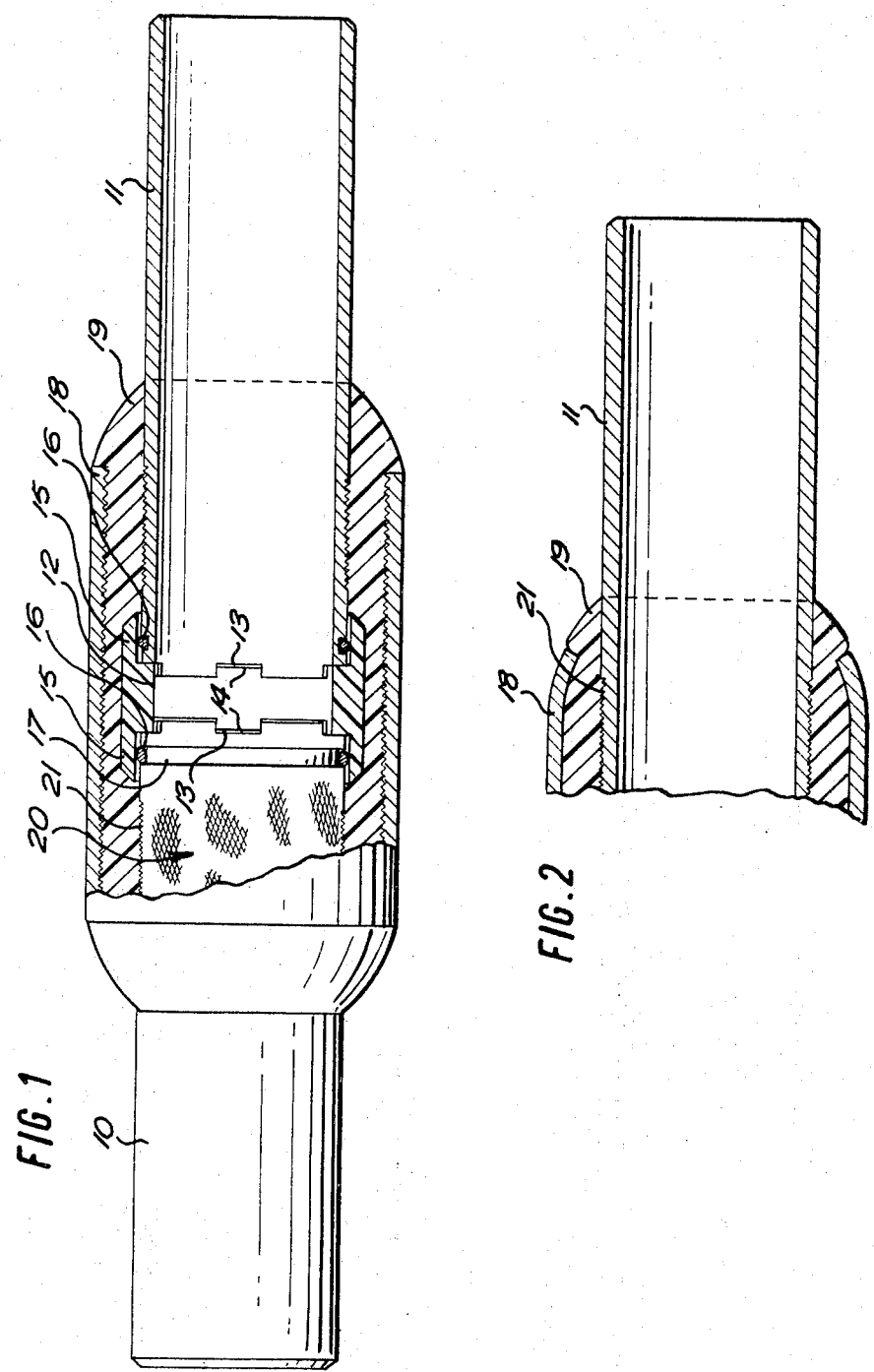

PIPE CONNECTIONS AND CONNECTORS THEREFOR

BACKGROUND OF THE INVENTION

This invention relates to pipe connections and connectors therefor. More particularly the invention relates to pipe connections and connectors which electrically insulate one pipe from the other.

One use for electrically insulated pipe connectors is in the supply pipe to a gas meter to provide a controlled stop for electrical current which is passed along the pipe, e.g. for tracing the path of the pipe or due to a short circuit, in the latter case the current being transmitted via an earthing wire connected to the pipe. Another use for these connectors is for the cathodic protection of a pipeline.

SUMMARY

According to the invention a pipe connection between two pipe lengths arranged end to end comprises an annular ring of electrical insulating material positioned between the pipe ends and maintaining the ends in spaced relation, the ring having annular flanges respectively surrounding the outer peripheral surface of each pipe end, an O-ring or like seal between said outer peripheral surface of each pipe end and the inner surface of the respective flange of the spacing ring, a casting of electrical insulating material overlapping each flange and the outer surface of each pipe end, an outer metal sleeve surrounding said casting, anchoring means on at least a part of the outer surface of each pipe end in contact with the casting precluding longitudinal movement of the pipe end relative to the casting, and further anchoring means precluding longitudinal movement of the outer sleeve relative to the casting.

The length of the annular ring is such that an electrical barrier exists between the pipe ends, and the thickness of the casting is such that an electrical barrier exists between the outer sleeve and each pipe end.

Preferably the electrical insulating material of the annular spacing ring and the casting is a material which maintains its physical characteristics at a temperature of 100°C. For example, a suitable material is glass fibre reinforced polyester which is capable of maintaining its physical characterisitics at 120°C for at least 10 years. Alternatively the annular spacing ring and the casting may be formed of epoxy resin.

It is also preferred that said anchoring means on the outer surface of the pipe ends is knurling, spaced circumferential grooves or a screw thread.

Said further anchoring means is preferably a screw thread on the inner surface of the outer sleeve. However, in the case of low pressure connections said further anchoring means may be provided by forming each end of the outer sleeve inwardly towards the respective pipe end.

Means may be provided to preclude rotation of each pipe end relative to the annular spacing ring. Each pipe end adjacent the spacing ring may have at least one slot for receiving a tongue projecting longitudinally from the ring.

The invention also provides a connector in which the above mentioned pipe ends constitute a pair of pups which project beyond the ends of the casting for connection with respective ends of two pipes to be connected together.

BRIEF DESCRIPTION OF THE DRAWINGS

FIG. 1 is an elevation partially cut away and partially in section, by way of example, of a pipe connector; and FIG. 2 shows a section through one end of an alternative pipe connector.

DESCRIPTION OF THE PREFERRED EMBODIMENTS

The example concerns the installation of an electrical stop or barrier in a gas supply pipe to a domestic house. Thereby should an earthing wire be connected to the gas pipe within the house, i.e., downstream of the meter, the length of pipe affected by an electrical current resulting from a short circuit will be limited to that portion downstream of the barrier.

With reference to FIG. 1, this electrical barrier is formed by a pipe connector comprising two pups 10, 11 assembled end to end and spaced apart by an annular ring 12 formed of glass fibre reinforced polyester. During installation the outer ends of the pups 10, 11 are welded to the ends of two gas supply pipes to form a connection between the two supply pipes.

Each pup end adjacent the ring 12 has four equidistantly spaced slots 13 for receiving tongues 14 projecting longitudinally from the ring. Each pup 10, 11 is thereby prevented from rotating relatively to the ring 12.

The ring 12 is also provided with longitudinally extending flanges 15 surrounding the pup ends, with an O-ring seal or the like between each flange and the respective pup end, the O-ring 16 being received within a circumferential groove 17 in the pup end. These O-ring seals preclude the escape of gas from the pipe fitted with the connector.

To maintain each pup end within the respective flange 15 of the spacing ring 12, the ring is surrounded by an outer metal sleeve 18 which is longer than the ring and radially spaced therefrom. The gap between the sleeve 18 and the ring 12 is then filled with glass fibre reinforced polyester to from a cast sleeve 19. The polyester casting 19 is maintained in position against longitudinal movement relative to the ring 12 by anchoring means comprising knurling 20 on the outer surface of the pup ends and a screw thread 21 on the inner surface of the sleeve 18. The thickness of the casting 19 is sufficient to maintain an electrical barrier between the sleeve 18 and each pup 10, 11.

FIG. 2 shows a second embodiment of pipe connector which is identical to the embodiment of FIG. 1 except that instead of providing the screw thread 21 on the inner surface of the outer sleeve 18, each end of the outer sleeve (only one end is shown) is bent inwardly into the casting 19 towards the respective pup 10, 11. Such means of anchoring the sleeve to the casting is particularly designed for low pressure pipe connections, but for high pressure pipe connections it is preferred that the anchoring means of FIG. 1 is employed.

In each embodiment other electrically insulating materials instead of glass fibre reinforced polyester may be used for the casting 19 and/or the ring 12, for example epoxy resin, depending on the use for the connector. In this embodiment this type of polyester has been selected because it is capable of maintaining its physical properties at the highest temperature to which the connector is likely to be heated whilst in use, i.e., 100°C.

Also the pipe connector may be applied to join two pipe ends in situ instead of two pups for subsequent connection to two pipe ends.

The O-ring may be replaced by other seals e.g. a Gasco seal, of different cross-section. One advantage of the pipe connection described above is that it enables the use of a conventional O-ring type seal to preclude the escape of gas within the pipe in combination with electrically insulating material to provide the electrical barrier between the pipe ends or pups.

Another advantage is that the connector combines electrical insulating properties with sufficient strength to maintain the joint between the pups or pipe ends.

With regard to the tracing of the path of a pipe by passing electrical currents along the pipe, the use of pipe connectors as described above is beneficial since they control the length of pipe subjected to the electrical current and therefore allow stronger currents to be employed.

I claim:

1. A leakproof pipe connection between two pipe lengths arranged end to end comprising an annular ring of electrical insulating material positioned between the pipe ends and maintaining the ends in spaced relation, the ring having annular flanges respectively surrounding the outer peripheral surface of each pipe end, an O-ring seal between said outer peripheral surface of each pipe end and the inner surface of the respective flange of the spacing ring, a casting of electrical insulating material overlapping each flange and extending beyond each flange to overlap the outer surface of and be in contact with the adjacent length of otherwise exposed pipe, an outer metal sleeve surrounding said casting, anchoring means on at least a part of said outer surface of each said length of otherwise exposed pipe in contact with the casting precluding longitudinal movement of the respective pipe end relative to the casting, and further anchoring means precluding longitudinal movement of the outer sleeve relative to the casting.

2. A pipe connection according to claim 1, wherein the electrical insulating material of the annular spacing ring and the casting is a material which maintains its physical characteristics at a temperature of 100°C.

3. A pipe connection according to claim 2, wherein the material is glass fibre reinforced polyester.

4. A pipe connection according to claim 2, wherein the annular spacing ring and the casting are formed of epoxy resin.

5. A pipe connection according to claim 1, wherein said anchoring means on the outer surface of each pipe end is a machining operation selected from knurling, spaced circumferential grooves and a screw thread.

6. A pipe connection according to claim 1, wherein said further anchoring means is a screw thread on the inner surface of the outer sleeve.

7. A pipe connection according to claim 1, wherein said further anchoring means is provided by forming each end of the outer sleeve inwardly towards the respective pipe end.

8. A pipe connection according to claim 1, including means to preclude rotation of each pipe end relative to the annular spacing ring.

9. A pipe connection according to claim 8, wherein each pipe end adjacent the spacing ring has at least one slot for receiving a tongue projecting longitudinally from the ring.

10. A pipe connector comprising a pipe connection according to claim 1, wherein the pipe ends are constituted by a pair of pups which project beyond the ends of the casting for connection with respective ends of two pipes to be connected together.

* * * * *